(12) United States Patent
Weber

(10) Patent No.: US 8,107,485 B2
(45) Date of Patent: Jan. 31, 2012

(54) NETWORK COMPONENT, METHOD FOR THE OPERATION OF SUCH A NETWORK COMPONENT, AND AUTOMATION SYSTEM WITH SUCH A NETWORK COMPONENT

(75) Inventor: Karl Weber, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 244 days.

(21) Appl. No.: 12/524,736

(22) PCT Filed: Jan. 25, 2008

(86) PCT No.: PCT/EP2008/050859
§ 371 (c)(1),
(2), (4) Date: Jul. 28, 2009

(87) PCT Pub. No.: WO2008/092805
PCT Pub. Date: Aug. 7, 2008

(65) Prior Publication Data
US 2010/0008372 A1  Jan. 14, 2010

(30) Foreign Application Priority Data
Jan. 29, 2007 (DE) .......................... 10 2007 004 306

(51) Int. Cl.
*H04L 12/413* (2006.01)
*G06F 15/16* (2006.01)

(52) U.S. Cl. ......... 370/401; 370/445; 709/208; 710/105
(58) Field of Classification Search .......... 370/353–395, 370/400–433, 450–468; 709/208–223
See application file for complete search history.

(56) References Cited

U.S. PATENT DOCUMENTS

| | | | | |
|---|---|---|---|---|
| 5,815,674 | A * | 9/1998 | LaBerge ........................ | 710/107 |
| 6,483,846 | B1 * | 11/2002 | Huang et al. .................. | 370/445 |
| 6,816,888 | B2 * | 11/2004 | Steindl .......................... | 709/213 |
| 7,107,372 | B2 * | 9/2006 | Van De Meulenhof et al. ............................. | 710/105 |
| 2002/0059477 | A1 | 5/2002 | Wimmer et al. | |
| 2002/0173321 | A1 * | 11/2002 | Marsden et al. .............. | 455/500 |
| 2003/0018734 | A1 * | 1/2003 | Luo et al. ...................... | 709/208 |
| 2007/0018783 | A1 | 1/2007 | Erhardt | |

FOREIGN PATENT DOCUMENTS

EP  1 184 754 A2  3/2002

* cited by examiner

*Primary Examiner* — Man Phan

(57) ABSTRACT

A network component including three ports as well as a method for the operation thereof is provided. The ports are exclusively allocated to individual hierarchical levels of a topology of an automation system, in which the network component is operated along with an optional plurality of additional network components, such that telegrams sent in the automation system are efficiently forwarded, particularly on the basis of designators assigned to the network component as an alias. The designators are assigned in an especially recursive process.

17 Claims, 6 Drawing Sheets

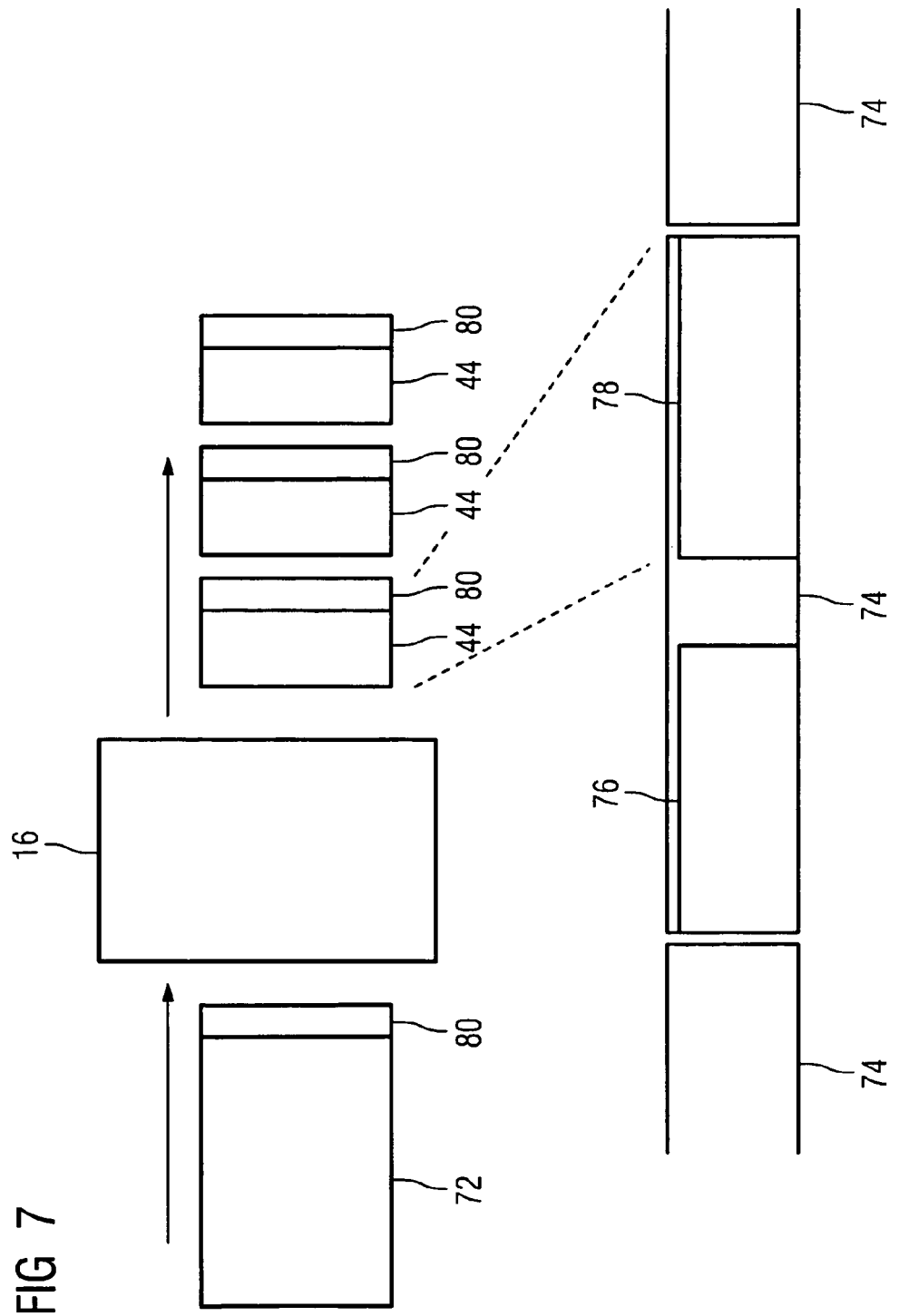

NETWORK COMPONENT, METHOD FOR THE OPERATION OF SUCH A NETWORK COMPONENT, AND AUTOMATION SYSTEM WITH SUCH A NETWORK COMPONENT

CROSS REFERENCE TO RELATED APPLICATIONS

This application is the US National Stage of International Application No. PCT/EP2008/050859 filed Jan. 25, 2008 and claims the benefit thereof. The International Application claims the benefits of German Patent Application No. 10 2007 004 306.8 DE filed Jan. 29, 2007; both of the applications are incorporated by reference herein in their entirety.

FIELD OF INVENTION

The invention relates firstly to a network component in an automation system, comprising at least a first, second and third input and output port, hereafter referred to simply as a port. The network component referred to above is in particular a so-called switch, in other words a network component for connecting a number of network segments in a local network or for connecting a number of communications subscribers combined in the local network.

BACKGROUND OF INVENTION

Such network components are generally known. So-called switches or bridges analyze the data traffic in the network and then after the analysis take logical decisions in respect of the forwarding of incoming datagrams by way of either the first, second or third port. To this end known network components manage a so-called forwarding database (FDB), in which, in addition to an address, normally a so-called MAC address, at which the network component receives a frame or one or a number of datagrams included therein—hereafter referred to collectively as a telegram—from another communications subscriber, the physical port, in other words the first, second, third, etc. port, at which this was received, is also stored. If the network component later receives a telegram, which is sent to an address associated with a communications subscriber, from which a telegram has already been received, it is possible to determine, by checking the FDB, by way of which of the ports of the network component this communications subscriber can be reached, and the telegram is forwarded in a correspondingly specific manner by way of this port. If a destination address is not yet known, known network components route the relevant telegram to all active ports.

Disadvantages of these known network components are on the one hand the resources required to hold the FDB ready and on the other hand the unfavorable conditions that result when a destination address is not yet known and telegrams are sent m a correspondingly unnecessary manner into a number of segments of the network, with the result that unnecessary bandwidth is taken up and is not available for other purposes for the relevant time interval. Also there is no need for an often time-consuming search in an FDB or similar with delayed forwarding proving unavoidable even with comparatively efficient, so-called hash searches due to the inevitable scope of such databases. A delay resulting from such searches would also be incurred at each forwarding station, so the delay time quickly adds up to tangible orders of magnitude.

A method for configuring a control system of an electrical switching unit is known from US 2002/0059477 A1, wherein the switching unit comprises a primary device and a number of control devices, which are connected to one another by buses in the known manner, such that the primary device is connected to a higher-order bus and the control devices have an internal process bus. A machine control system is known from EP 1 184 754 A2, wherein the system is divided into different hierarchies and communications relations exist in each hierarchical level between the system components there.

SUMMARY OF INVENTION

Neither of the above-mentioned documents deals with network components as defined above, just with those communications subscribers that function as actual consumers or producers of telegrams to be sent in a system, while the network components to which the invention relates can be seen more as an interface between such entities (switch, bridge) and in individual instances can even be included in such entities, but for example never produce data themselves, simply receiving such data from other entities or network components and forwarding it according to an approach proposed by the invention.

One object of a first aspect of the present invention is therefore to specify a network component, with which the above-mentioned disadvantage(s) is/are avoided as far as possible or its/their impact at least is reduced.

This is achieved with a network component as claimed in the claims. To this end with a network component for use in an automation system, which comprises at least a first, second and third input and output port (port), provision is made for there to be a connection to other communications subscribers in the automation system, in particular to other network components, within a hierarchically identical line of a network topology of the automation system by way of the first and second port and for there to be an interface with other communications subscribers in the automation system, in particular other network components, in a hierarchically lower-order line of this network topology by way of the third and optionally other ports, with a network component being connected to a third or further port of a preceding network component by way of the latter's first port. The at least three ports of a network components are thus assigned exclusively to individual hierarchy levels within the automation system, the term automation system here not simply covering a collection of standard automation devices known per se, i.e. for example controllers, in particular programmable logic controllers, decentralized peripheral devices, etc., but also the communications connections existing between such devices, referred to collectively as communications subscribers, in other words the actual network.

The network is seen as being organized in lines, with a first line being assigned to a central communications subscriber, e.g. a higher-order station in the form of a master computer or the like. A number of communications subscribers can be provided within one line, at least some of them being configured as network components of the type mentioned above or at least some of them having such a functionality. The first and second ports function here as an input or output depending on the direction of telegrams to be transferred by way of the network. By connecting the individual ports, in other words by connecting the first port of a first network component, to the second port of a subsequent further network component, the communications subscribers, in particular the network components, are connected one behind the other within the same line. All the connections which result from connection to the first or second port of the above-mentioned network components are considered to be associated with a hierarchically identical line. An interface with other communications subscribers in the automation system, in particular other network components, is possible by way of the third and optionally further ports. These communications subscribers or network components no longer belong to the line with which the network component is associated, by way of the third port of which the connection is established. Every communications subscriber connected in this manner is considered to be associated with a hierarchically lower-order line. If the communications subscriber connected in this manner is a network component of the type mentioned in the introduction, the hierarchically lower-order line can be extended to become an actual line, in other words a network segment with more than two communications subscribers, by connecting further communications subscribers, in particular network components, to its second port. If the communications subscriber connected in the above-mentioned manner is a network component of the type mentioned in the introduction, an again hierarchically lower-order line can be provided by connection to its third port, etc. The dedicated use of the ports known per se with network components on the one hand for connections within a hierarchically identical line and on the other hand for connections to a hierarchically lower-order line results in a unique structure in the automation system, allowing the destination-specific forwarding of telegrams.

To this extent the invention also relates to a method for the operation of a network component of the type mentioned in the introduction and one object of this aspect of the invention is to specify a method for a favorable use of the network component presented in the introduction and then described in more detail. To this end provision is made for an alias, in other words a designator in the manner of an address, in particular an alias in addition to its network address, in other words for example an IP address or a MAC address, to be assigned already or in future to the network component, providing information about a hierarchical position of the network component in the automation system.

An alias for example is then preferably assigned to the master computer mentioned in the introduction, indicating the latter's central position in the automation system, e.g. in the form of a figure or a so-called string with the value or content "1". Telegrams sent between individual communications subscribers in the automation system then designate a destination communications subscriber at least based on its alias as well. When a network component receives a telegram a specific alias is compared on this basis with an alias of a destination communications subscriber included in the received telegram, hereafter referred to simply as a destination alias. Depending on the result of the comparison the telegram is then forwarded either by way of the first, second or third port or any other ports. In other words the comparison of the specific alias and destination alias allows the unique selection of one of the ports of a network component for forwarding the received telegram by way of the port resulting specifically from the comparison.

In one preferred embodiment of the method provision is made for the telegram to be forwarded by way of the first port, if a component of the specific alias designating the specific level of the network component, referred to hereafter as the relevant alias segment, and a corresponding component of the destination alias, similarly referred to hereafter as the relevant destination alias segment, in this sequence satisfy a "less than or equal to" relationship. Similarly forwarding takes place by way of the second port if the relevant alias segment and the relevant destination alias segment satisfy a "greater than or equal to" relationship or by way of the third port if the relevant alias segment and the relevant destination alias segment satisfy an "equal to" relationship.

In a specific automation system for example "1", "2", "3", etc. or "3.1.1", "3.1.2", "3.1.3", etc. can result as the alias of a number of network components associated with a hierarchically identical line. The relevant component of the respective alias is the component relating to the specific level of the network component. In the first instance, in which each network component is assigned on the hierarchically topmost level, the alias itself is the relevant component. In the second instance, in which an alias is given by way of example each time, as it could relate to a network component in a "hierarchically third level", the relevant component is the last figure of the alias designating this level, in other words "1". "2", "3", etc. again.

If therefore one of the network components, which are associated with the hierarchically topmost line of the automation system, receives a telegram, which is intended for a communications subscriber with the alias "3.1", this telegram is forwarded by each network component as long as its relevant specific alias segment, in other words "1", "2", and the relevant destination alias segment, in other words "3", in this sequence satisfy a "less than or equal to" relationship, in other words "1≦3" and "2≦3" here.

The telegram would be forwarded by way of the second port, if the relevant specific alias segment and the relevant destination alias segment in this sequence satisfy a "greater than or equal to" relationship. Referring to the example selected above therefore the second port would be selected, if the communications subscriber designated by the alias "3.1" responds on receipt of the telegram and the response telegram is intended for a communications subscriber, which is hierarchically located "in front of" the network component with the alias "3".

The third port is used to forward telegrams, if the relevant specific alias segment and the relevant destination alias segment satisfy an "equal to" relationship. In the example selected in the introduction the telegram was intended for the communications subscriber with the alias "3.1" so that, as soon as the telegram reaches the network component designated by the alias "3", the "equal to" relationship is satisfied in respect of the relevant specific alias segment and the relevant destination alias segment of the telegram to be transmitted, so that the third port is selected for forwarding the telegram and the telegram therefore reaches the destination communications subscriber.

To select a communications path to the destination communications subscriber no data, in particular no data in the manner of an FDB or similar used hitherto in the prior art, has to be held ready in the network components involved, so the load on the network components is reduced in this respect. Also the communications path to the respective communications subscriber can be determined fully at any time, regardless of whether the addressed destination communications subscriber has already identified itself to adjacent communications subscribers, in particular to network components, as required to set up an FDB. In this respect the network, in other words the automation system, is relieved of unnecessary communication, which results in the prior art in particular when a destination communications subscriber is not yet known so that the relevant network component has to forward the received telegram to all available ports to be sure of reaching the destination communications subscriber.

In a further advantageous embodiment of the method a telegram received by way of the first port is rejected as misdirected if the relevant specific alias segment and the relevant destination alias segment in this sequence satisfy a "less than or equal to" relationship. According to the forwarding system described above and explained in more detail below a telegram can only be forwarded by way of the second port of a network component, if the relevant specific alias segment of this network component and the relevant destination alias segment of the telegram in this sequence satisfy a "greater than or equal to" relationship. As the first port of a subsequent network component can only be connected directly or indirectly to the second port of a preceding network component further on in the line, every telegram received by way of this first port and for which the relevant specific alias segment and the relevant destination alias segment in this sequence satisfy a "less than or equal to" relationship must be misdirected. Similarly a telegram received by way of the second port will also be rejected as misdirected if the relevant specific alias segment and the relevant destination alias segment in this sequence satisfy a "greater than or equal to" relationship.

Such misdirections should not occur, if the automation system is only equipped with network components of the type described here or with network components which operate according to the method described here. However the identification and rejection of misdirections is also expedient in such an automation system given that any incorrect forwarding operations are identified in this manner and no longer take up resources in the automation system unnecessarily. Also in heterogeneous automation systems, in other words systems which also contain network components that do not have the characteristics of the network components described here or do not operate according to the method described here, it is possible to identify and reject unavoidable misdirections with the above-mentioned preferred embodiment.

The invention therefore also relates generally to an automation system, in which such network components or network components operating according to such a method are present. Such an automation system with a number of communications subscribers, of which at least some network components are of the type mentioned in the introduction or below or operate or can be operated according to the method described in the introduction or below, hereby resolves the problem of specifying an automation system in which it is possible to forward telegrams efficiently in the direction of the destination communications subscriber without a plurality of data having to be held ready in the network components and without telegrams being forwarded unnecessarily by a network component by way of a number of ports.

The automation system here can also comprise network components, which only have two ports, in other words for example only ports for forwarding telegrams in the same line or only ports for a transfer from or to a lower-order line. Such network components are provided instead of the network components with at least three ports otherwise described here, depending on the local topology of the automation system.

With regard to a further embodiment of such an automation system provision is advantageously made for a unique alias to be allocated to every communications subscriber, based on the following formation system: starting from a central communications subscriber in a first allocation segment for all communications subscribers, which are connected to the central communications subscriber in a hierarchically identical line, a component of the respective alias of these communications subscribers, in particular network components, designating a first level of the communication connections in the automation system, is increased with increasing distance from the central communications subscriber. If therefore the figure or string "1" is provided as the alias for the central communications subscriber, a higher alias than the alias of the central communications subscriber results for a communications subscriber, in particular a network component, adjacent to the central communications subscriber, for example "2". For further subsequent communications subscribers, in other words as the distance from the central communications subscriber increases, an alias results in each instance, which is higher than the alias of the preceding communications subscriber along the same line. The increase in the numerical value of the alias does not necessarily have to take place in increments of one but can also reflect the actual spatial distance.

In a second allocation segment for all communications subscribers reached in this manner, which are network components of the type described here and to which at least one communications subscriber is connected directly or indirectly by way of their third port, an alias is allocated for this connected communications subscriber. This is formed from the alias of the hierarchically higher-order network component by adding a component designating a hierarchically lower-order level of communications connections in the automation system, in other words the alias "3.1" for a communications subscriber that directly follows a network component with the alias "3".

Finally in a third allocation segment for all network components to which an alias has been allocated according to the second allocation segment above the first and second allocation segments are repeated, with the respective network component taking the place of the central communications subscriber and the respective hierarchical level taking the place of the first level of communications connections. To this extent it is a recursive formation system, which has captured all the communications subscribers by the end of the recursion, so that a unique alias is allocated to every communications subscriber in the automation system, allowing it to forward telegrams in the described efficient manner when using network components of the type described here or network components which operate according to the method of the type described here.

To this extent the invention also relates to a method for transmitting data in an automation system with a number of communications subscribers, of which at least individual ones are embodied as network components of the type described here or as network components that are operated or can be operated according to the method described here. With this method each network component orders telegrams, which it has received for forwarding to a respective destination communications subscriber, taking into consideration at least the component of the alias of the destination communications subscriber (destination alias) included in each such telegram and designating a specific level of the network component. A network component with the alias "2.3", which can thus already be identified as associated with a hierarchically second level, therefore orders telegrams which it receives and which are intended for forwarding to destination communications subscribers with the alias "2.4", "2.6", "2.6.1", "2.7" according to the alias component belonging to this second level, i.e. "4", "6", "6" and "7". A compacted frame (compacted telegram) is formed on the basis of the telegrams thus ordered by lining them up and combining them in a single frame instead of the individual frames hitherto transmitted for each telegram. This compacted frame is forwarded instead of the individual frames received during a predetermined or predeterminable time period. The advantage of this aspect of the invention, which is optionally independently patentable, is that in an automation system, in which an alias is or can be assigned to each communications subscriber according to the formation system described above, it is possible to use these designators, which as designators of the respective destination communications subscriber are also contained in sent telegrams, to order the payload, in other words datagrams, contained in such telegrams easily in such a manner as they are "consumed", i.e. received and evaluated, along the respective line by the communications subscribers associated with this line. A compacting of telegrams by lining up a number of individual telegrams or the payload contained therein is known per se but the significant aspect here is that the payload in the compacted telegram is also arranged in a sequence based on the topology of the communications subscribers, so that simple conditions prevail for the consumption of the individual payload. The advantage is that only one message, in other words only the compacted telegram, has to be handled and with this one telegram it is possible to reach a number of destination communications subscribers so that even complex automation structures can be managed reliably. Also data throughput is optimized by dynamizing the frame structure and decoupling sending and receiving.

One particular possibility for increasing the data throughput in such a manner results if in conjunction with the receipt of a compacted telegram every communications subscriber extracts the payload, i.e. datagrams, contained therein and intended for it and shortens the compacted telegram by the or each extracted datagram or if the compacted telegram is shorted by the or each extracted datagram.

In the case of compacted telegrams, in other words long frames resulting from a combination of a number of individual datagrams which are therefore extensive, it can happen that a first communications subscriber could already extract datagrams at a time when the complete transmission of the compacted telegrams by the sending communications subscriber in each instance has not yet been terminated. Normally on receipt of a telegram a communications subscriber would await receipt of a check code provided at the end of the telegram, verify the correctness of the check code and only then access the contained payload. If in the case of long telegrams payload is already present with a first recipient at a time when the transfer of the telegram has not yet been completely terminated by the current sender, with the situation until now the recipient is not yet able to access the payload, as it cannot yet be verified based on the check code which is not yet present. It is necessary then to await full receipt of the telegram and buffer it. To avoid this disadvantage, provision is advantageously made for specific check data to be assigned to each datagram in a compacted telegram. It is thus possible for all payload, for which this check data is already present with the respective recipient, to be verified on the basis of the check data and optionally consumed. It is not necessary to await receipt of the check code in some instances still present at the end of the compacted telegram. The provision of check data for every datagram included in the telegram therefore allows early access to the payload contained in the telegram so that communication can also be accelerated, in that for example the respective datagram is immediately consumed or provided for forwarding to subsequent communications subscribers.

In combination with accelerated forwarding and an advantageous arrangement of the datagrams this method also supplies a high level of efficiency. Processing of the datagrams can be carried out at the same rate as forwarding, so that only one factor, i.e. just the duration of processing or just the duration of forwarding, becomes influential when calculating the arrival of a datagram at the respective destination communications subscriber.

In conjunction with the methods described above and explained in more detail below the invention also relates to a computer program with program code instructions that can be executed by a computer to implement the respective method; in other words to implement the method for the specific forwarding of received telegrams by way of a specific port, to implement the method for rejecting individual telegrams as misdirected, to implement the method for allocating an alias respectively to all the communications subscribers included in an automation system and to implement the method for lining up and sorting individual datagrams to obtain a compacted telegram and to implement the method, wherein a compacted telegram is shortened, as soon as payload contained in datagrams included therein is consumed by a communications subscriber functioning as the recipient. Finally the invention also relates to a computer program product with one or more such computer program(s) that can be executed by a computer. A storage medium or similar is one possible computer program product, e.g. a data carrier in the form of a diskette or even a semiconductor memory, in particular a semiconductor memory integrated in a device suitable or provided to function as a communications subscriber in the sense used here or one that can be combined with such.

An exemplary embodiment of the invention is described in more detail below with reference to the drawing. Corresponding objects or elements are shown with the same reference characters in all the figures.

The or each exemplary embodiment should not be seen as restricting the invention. Rather in the context of the present disclosure numerous changes and modifications are possible, in particular those variants and combinations which will emerge for the person skilled in the art in respect of achieving the object by combining or modifying individual features or elements or method steps in conjunction with those described in the general or specific portion of the description and contained in the claims and/or drawing and which result in a new subject matter or new method steps or method step consequences due to combinable features.

BRIEF DESCRIPTION OF THE DRAWINGS

In the drawing

FIG. 6 shows a diagram to clarify communication with a domain not included in the automation system and FIG. 7 shows a schematically simplified diagram of a transfer of telegrams from such an external domain and a division of such telegrams taking place in this process.

DETAILED DESCRIPTION OF INVENTION

Figure 1:
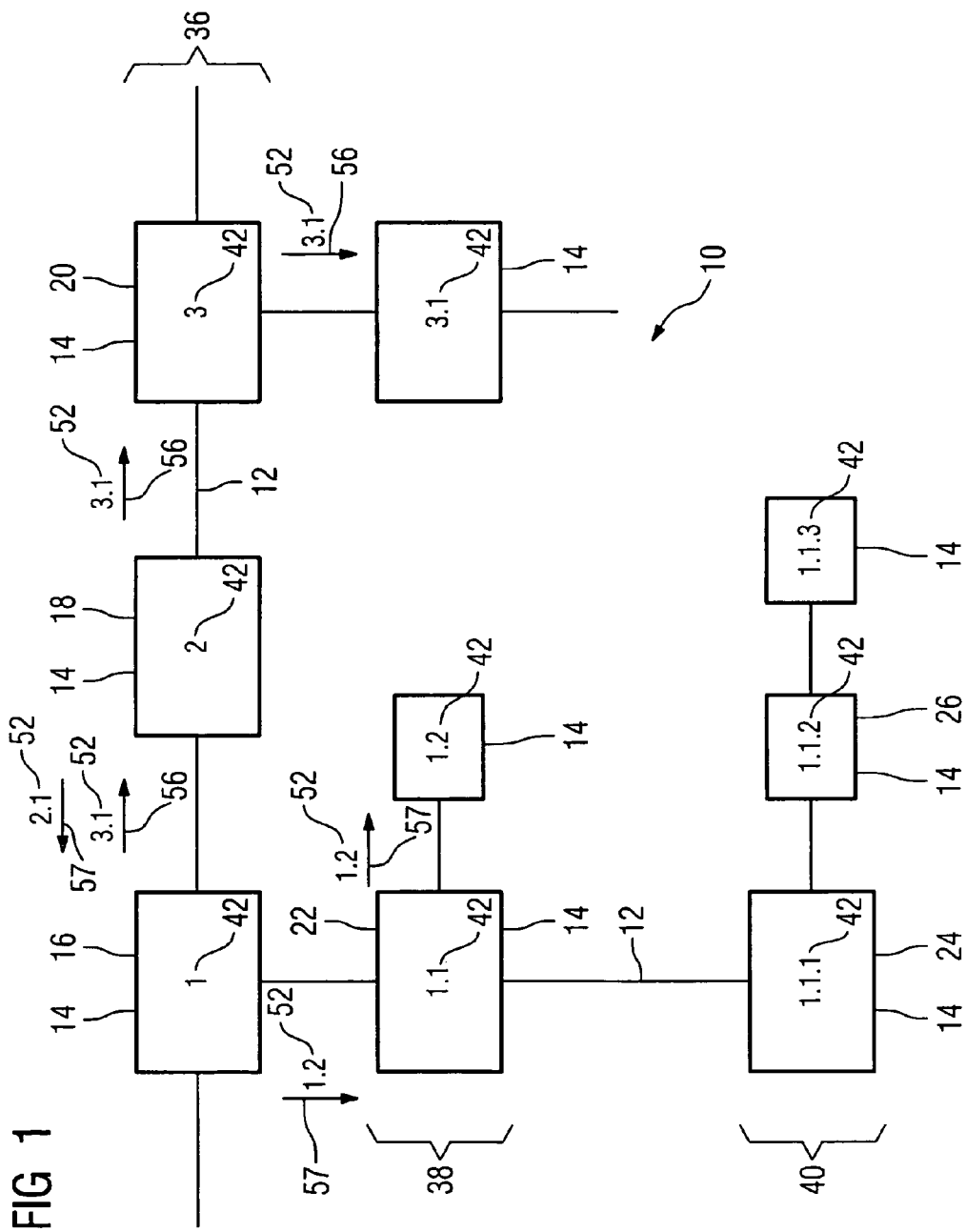
FIG. 1 shows a schematically simplified diagram of an automation system with communications subscribers contained therein and connected for communications purposes by a network, of which at least individual ones are embodied as a network component according to the present invention.

FIG. 1 shows a schematically simplified diagram of an automation system designated as a whole as 10. The automation system 10 comprises a number of communications subscribers 14 combined in a network 12 and to this extent connected to one another for communication purposes.

Individual or all the communications subscribers 14 are automation devices, i.e. controllers, such as programmable logic controllers, so-called decentralized peripheral devices, process computers, (industrial) computers and the like or drive controllers, frequency converters and similar, in other words devices, facilities or systems as are used or can be used to control, regulate and/or monitor technological processes, e.g. for converting or transporting material, energy or information etc., with energy being expended or converted in particular by way of appropriate technical facilities, such as sensors or actuators for example. Only the communications subscriber 14 is shown in each instance in schematically simplified form. Depending how it is considered, such a communications subscriber can also be seen as a component of an automation device of the type described above, such that it supplements the functionality of the respective automation device with communication functionalities.

Individual communications subscribers 14 can be embodied as network components 16, 18, 20, 22, 24 in the sense of the present invention. Reference will only be made below to individual communications subscribers 14 or such network components 16-26 of an individual such network component 16-26, as it is not important for an understanding of the invention whether the network component 16-26 is part of a comprehensive system, e.g. a programmable logic controller, or whether the network component 16-26 is part of the automation system 10 without more extensive functionality. In fact individual network components 16-26 can be provided to replace former so-called switches as communications subscribers 14 in the automation system 10, connecting individual segments of the network 12 to one another. On the other hand individual network components 16-26 can be part for example of a programmable logic controller, a master computer or such like and therein supply the same functionality as a standalone network component 16-26. The description which follows therefore only relates to communications subscribers 14 and network components 16-26.

The diagram in FIG. 1 anticipates important aspects of the invention which are described below with reference also to FIG. 2.

Figure 2:
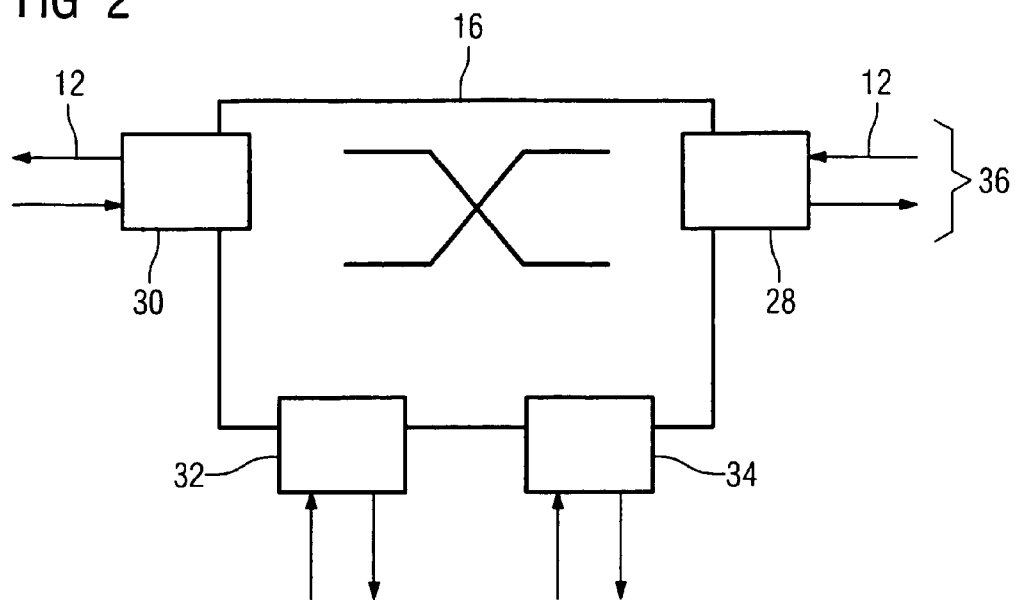
FIG. 2 shows a schematically simplified diagram of such a network component.

FIG. 2 shows an individual network component 16. This comprises a first input and output port 28, a second input and output port 30 and a third input and output port 32. Further input and output ports 34, in other words even more than the one further input and output port 34 shown, can be provided in particular embodiments of the network component 16. The description is continued for network components 16-26, which comprise at least a first, second and third input and output port 28-32—hereafter referred to simply as ports 28, 30, 32. Each network component 16-26 can receive data from the automation system 10 or forward data into the automation system 10 by way of each of the ports 28-32. A connection to other communications subscribers 14, in particular to other network components 18-26, which belong with the respective network component 16, from which the connection starts, to a hierarchically identical line 36 (see also FIG. 1) of communications connections in the automation system 10, exists or is established by way of the first and second ports 28, 30. An interface with other communications subscribers 14, in particular with other network components 22, 24 in a hierarchically lower-order line 38, 40 (see also FIG. 1) exists or can be established by way of the third and optionally further ports 32, 34. The first and second ports 28, 30 are therefore provided exclusively for data transmissions within a hierarchically identical line 36, while the third and any further port 32, 34 are provided exclusively for data transmissions in a hierarchically lower-order line 38, 40. Such a unique assignment makes it possible to organize data transmission in the automation system 10 according to a fixed system, which facilitates the location of a valid communication path to a destination communications subscriber 14, without extensive data relating to indirectly or directly adjacent communications subscribers 14 having to be stored for this purpose in the individual communications subscribers 14 passed through along the communication path. The data throughput in the automation system 10 can also be increased in that parallel data transmissions by way of a number of ports 28-32, 34 of the same network component 16-26 which could not be avoided with former solutions according to the prior art are now avoided.

FIG. 1 shows every communications subscriber 14 with a designator hereafter also referred to as an alias 42. The designators "1", "2" and "3" are assigned as aliases 42 in the sequence shown to the network components 16, 18, 20 contained in the hierarchically highest line 36. Hierarchically below the network component 16 with the designator "1" as an alias 42 the automation system 10 comprises two further respectively hierarchically identical lines 38, 40 with communications subscribers 14 contained therein, to which the designators "1.1", "1.2" or "1.1.1", "1.1.2" and "1.1.3" are respectively assigned as aliases 42.

Each alias 42 is assigned uniquely to a communications subscriber 14 in the automation system 10. The formation scheme described below is used for this purpose: first, starting from a central communications subscriber 14, to which an initial alias 42, i.e. "1" for example, is allocated due to its characteristic as central communications subscriber 14, for all the communications subscribers 14, which are connected to the central communications subscriber 14 in a hierarchically identical line, a component of the respective alias 42 of this communications subscriber 14 designating a first level of communications connections in the automation system 10 is increased with distance from the central communications subscriber. In other words: starting from the initial alias 42 with the value "1", a component of the respective alias 42 designating the same level of communications connections is increased. The designators "2" or "3" thus result as aliases 42 for the network components 18, 20 following the central communications subscriber 14.

For all the communications subscribers 14 reached in this manner, which are network components 16-26 of the type described here and to which at least one communications subscriber 14 is connected directly or indirectly by way of its third port 32, an alias 42 is allocated to this communications subscriber 14, which is formed from the alias of the hierarchically higher-order network component 16-20 by adding a component designating a hierarchically lower-order level of communications connections in the automation system 10. For the network component 16, to which the designator "1" is assigned as an alias 42, the designator "1.1" is allocated as an alias 42 for the network component 22 that can be reached by way of its third port 32, the addition of the component "0.1" designating the hierarchically lower-order level of communications connections in the automation system 10. The same applies to the network component 20, to which the designator "3" is assigned as an alias 42 and to the successor of which, reachable by way of its third port 32, the alias 42 "3.1" is assigned as a designator, with the added component ".1" designating a hierarchically lower-order level here too. Further such components are added correspondingly to the respective alias 42 for a hierarchically lower-order level, in other words for example the further lower-order line 40 following the line 38, so the designator "1.1.1" results as an alias 42 for the network component 24 designated with the reference character 24 in FIG. 1. If the communications subscriber 14, shown in FIG. 1 with the designator "1.2" as an alias, is embodied as a network component 16-26 and further communications subscribers 14 were connected by way of its third port 32, a designator "1.2.1" would result as an alias 42 for a first such communications subscriber 14.

For all the network components 16-26, to which an alias was allocated according to the last described measures, said alias comprising a component which designates a hierarchically lower-order level, all the measures in the formation system described above are repeated, with the respective network component taking the place of the central communications subscriber 14 and the respective hierarchical level 36, 38 40 taking the place of the first level 36 of communications connections. The formation system is thus a recursive formation scheme and by the end of the recursion a unique alias 42 is allocated to every communications subscriber 14 in the automation system.

Figure 3:
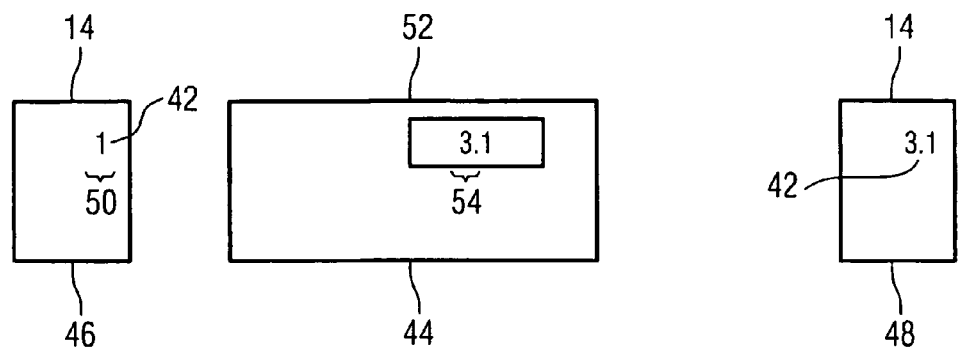
FIG. 3 shows a diagram to clarify designators of the individual communications subscribers used during a data transmission in the automation system.

The transmission of data between individual communications subscribers 14 in such an automation system is described below based on FIG. 3 with reference to FIG. 1 and FIG. 2. FIG. 3 shows a schematically simplified diagram of a telegram 44, in other words an organizational form of data to be transmitted by way of the network 12 (FIG. 1), e.g. a so-called frame with at least one datagram contained therein. The telegram 44 is sent by a communications subscriber 14 functioning as a sender 46 and is intended for a communications subscriber 14 functioning as a recipient 48. The recipient 48 is optionally also designated as the destination communications subscriber and as in principle any communications subscriber 14 can be considered to be a destination communications subscriber, is optionally also designated generally with the reference character 14.

For the description which follows it should be assumed that the telegram 44 is to be sent by the network component 16 (sender 46) shown in FIG. 1 with the designator "1" as an alias 42 to the communications subscriber 14 (recipient 48) shown in FIG. 1 with the designator "3.1" as an alias 42. To this end the telegram 44 has the alias 42 of the destination communications subscriber 14 as a destination alias. Generally speaking telegrams 44 sent between the communications subscribers 14 in the automation system 10 designate a recipient 48 or destination communications subscriber 14 at least also on the basis of its alias 42. As soon as the telegram 44 is ready for forwarding in the sender 46, in other words for feeding into the network 12, the sender 46 has to decide via which of the ports 28-32 in the sender 46 forwarding is to take place. To this end a component of the specific alias 42, i.e. "1", designating the specific level of the sender 46 is considered as the relevant specific alias segment 50. A corresponding relevant component of an alias 42 of the recipient 48 (destination alias 52) is likewise formed and further used as the relevant destination alias segment 54. As long as the relevant specific alias segment 50 and the relevant destination alias segment 54 in this sequence satisfy a "less than or equal to" relationship, the telegram 44 is forwarded by way of the first port 28 of the relevant network component 16 to 26. In this way the telegram 44 shown in FIG. 3 first travels from the network component 16 designated with the designator "1" as an alias 42 in FIG. 1 to the network component 18 designated with the designator "2" as an alias 42 and finally to the network component 20 designated with the designator "3" as an alias 42. The hitherto satisfied "less than or equal to" relationship is no longer satisfied here for the comparison of the relevant specific alias segment 50 and the relevant destination alias segment 54; instead an "equal to" relationship is satisfied, with the result here that the telegram 44 is forwarded by way of the third port 32 and thus reaches the recipient 48.

The same communication is also shown in FIG. 1 with a first set of arrows 56, with the destination alias 52 being indicated in each instance next to each arrow 56, it being possible for an arrow 56 together with a destination alias 52 to be considered to be another representation of a telegram 44 (FIG. 3). If at a later time a telegram 44 is to be sent from the network component 18 shown in FIG. 1 with the designator "2" as an alias 42 to the communications subscriber 14 shown with the designator "1.2" as an alias 42, similar conditions in principle result, which are described below with reference to further arrows 58 in conjunction with a destination alias 52, as shown in FIG. 1. After that, as soon as the telegram 44 is ready for sending in the network component 18 functioning as the sender 46, the relevant specific alias segment 50, in other words "2" is first compared with the relevant destination alias segment 52, in other words "1". This time the relevant alias segments 50, 52 satisfy a "greater than or equal to" relationship so the second port 30 is selected for forwarding the telegram 44. The telegram 44 therefore travels to the network component 16 shown with the designator "1" as an alias 42. When the relevant specific alias segment 50 and the relevant destination alias segment 54 are compared here an identity results, so the third port 32 is selected for forwarding the telegram 44. The telegram 44 therefore reaches the second level 38 but has not yet arrived at the recipient 48. For forwarding purposes the component of the specific alias 42 designating the specific level is now formed as the relevant specific alias segment 50 for the network component shown with the designator "1.1" as an alias 42; in this instance the last figure of "1.1", i.e. "1". The corresponding component of the destination alias 52 now relates to the same level 38 so the last figure, i.e. "2", now likewise results as the relevant destination alias segment 54 of the destination alias 52. The first port 28 is thus selected by the network component 22 for forwarding the telegram 44 to the recipient 48.

Figure 4:
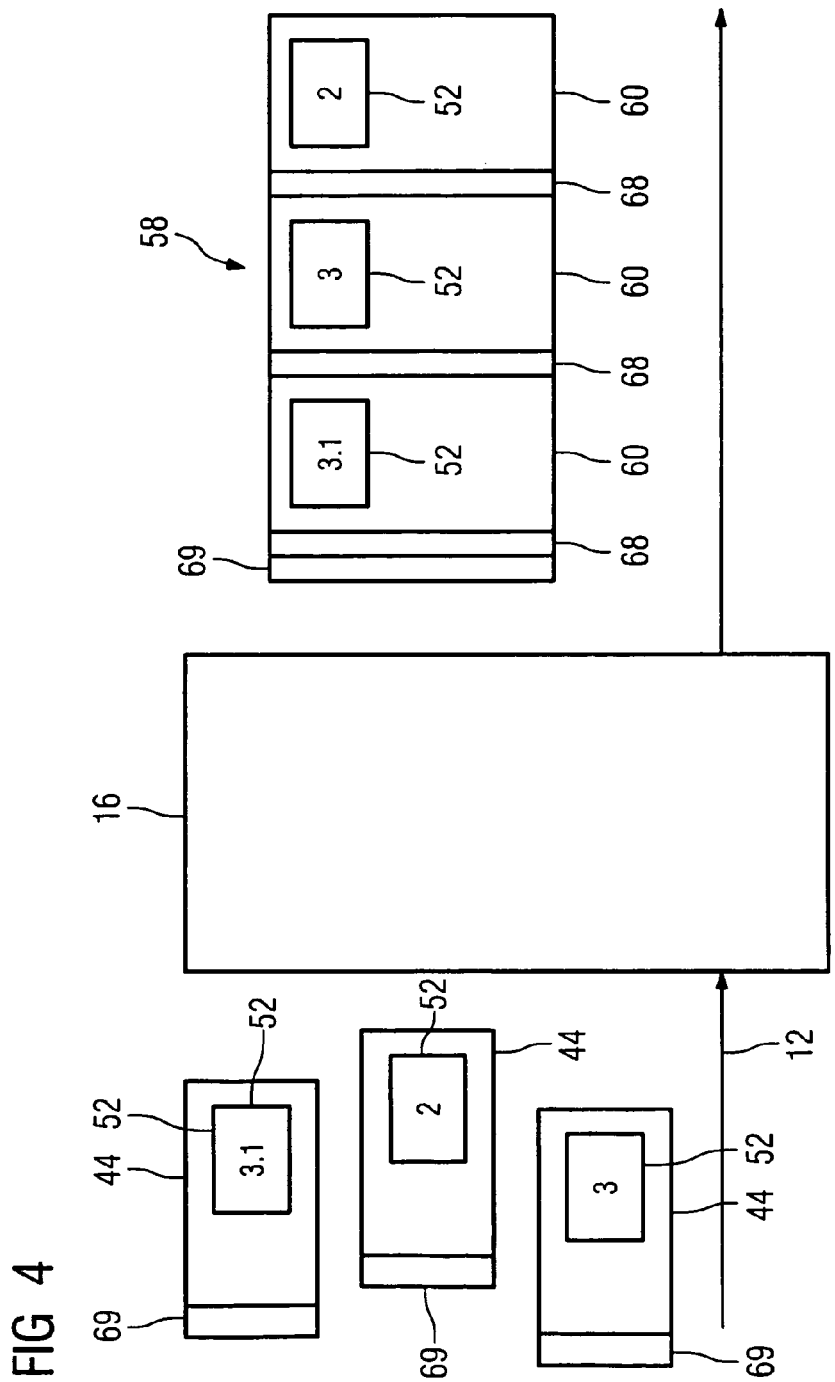
FIG. 4 shows a diagram to clarify an independent aspect of the invention according to which communication in the automation system is improved in that a compacted telegram containing a number of datagrams is formed from individual telegrams each containing datagrams as payload.

FIG. 4 shows a schematic diagram to clarify a further, optionally independently patentable, aspect of the invention, according to which each network component (16-26 (FIG. 1) orders telegrams 44 received during a predetermined or predeterminable time period for forwarding to a respective recipient 48 (FIG. 3) taking into account at least the components of the alias 42 of the recipient 48 (destination alias 52) contained in each such telegram 44 designating a specific level of the network component 16.

The network component 16 is assigned to the topmost level 36, so that the first figure of the destination alias 52 in each instance is the component designating the specific level of the network component 16. Accordingly the telegrams 44 shown in FIG. 4 as being received by the network component 16 are sorted into increasing or decreasing order according to transmission direction, in other words according to the port 28, 30 to be used. The network component 16 generates a compacted telegram 58 therefrom. This is then forwarded by the network component 16 and in this manner reaches the respective recipient 48. While the compacted telegram 58 is being forwarded, each communications subscriber 14 extracts payload, in other words datagrams, intended for it on receipt of a compacted telegram 58, the compacted telegram 58 being shortened by the or each consumed/extracted datagram 60.

Figure 5:
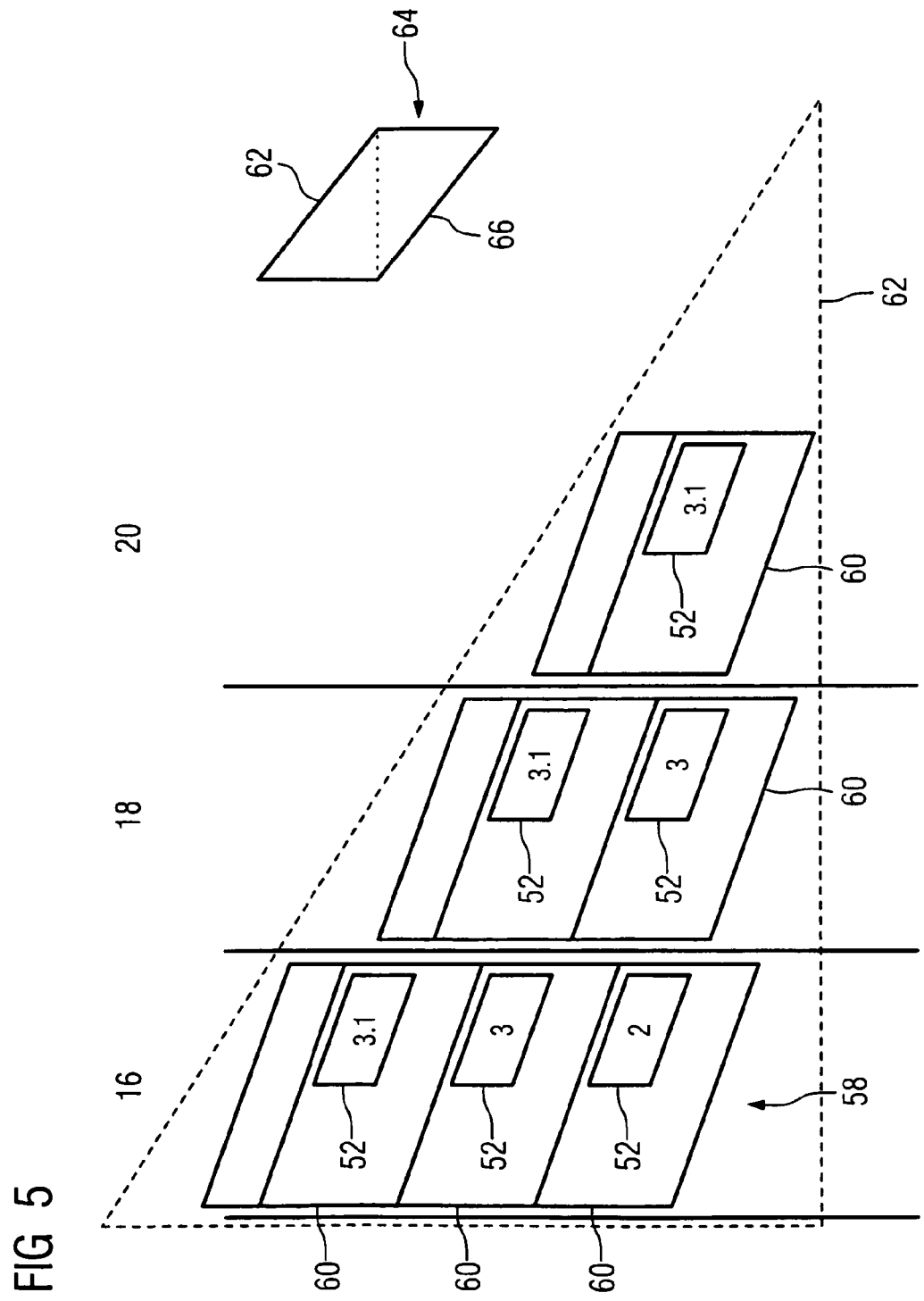
FIG. 5 shows a diagram to clarify the effect of consumption of datagrams contained in a compacted telegram by the respective recipient and a corresponding shortening of the compacted telegram.

The time benefit that can be achieved herewith can be shown graphically. See FIG. 5 for this. In FIG. 5 the network components 16-20 already shown in FIG. 1 are shown in a horizontal direction as columns 16, 18, 20. A compacted telegram 58 containing three datagrams 60 has to be transmitted from the network component 16, as described before with reference to FIG. 4. As soon as the compacted telegram 58 reaches the network component 18, said network component 18 consumes the datagram 60 intended for it. In this context the compacted telegram 58 is shortened correspondingly. As soon as the compacted telegram 58 then reaches the network component 20, said network component 20 consumes the datagram 60 intended for it therein, so the compacted telegram 58 is now reduced to one datagram 60, which is now forwarded to the communications subscriber 14 identified by the destination alias 52. The situation shown in FIG. 5, in which the overall surface area of the transmitted telegrams 58 resembles a triangle in a graphic representation is a sought-after, optimal situation, while without initial compacting and then successive consumption a parallelogram 64 instead results as the surface area of the datagrams 60 then transmitted in individual frames, combining the triangle 62 shown with a further triangle 66, as shown top right in FIG. 5.

A distance between the point of origin of the selected coordinate system and the "outermost corner" of the last remaining telegram 58 can be seen as a measure of the efficiency of the transmission. This distance is shorter when the overall surface area of the transmitted telegrams 58 resembles a triangle 62 than if a parallelogram 64 were taken as the basis for the overall surface area of the transmitted telegrams 58.

So that a communications subscriber 14 can consume payload (datagrams 60) intended for it in a compacted telegram 58 immediately at the time of receipt, provision is made for check data 68 (FIG. 4) to be assigned to each datagram 60. Such check data 68 allows a datagram 60 to be consumed as soon as the check data 68 and the datagram 60 protected by it reaches a communications subscriber 14 (FIG. 1). According to the prior art until now it was only possible to evaluate payload in a datagram 60 when a check code 69 provided at the end of the telegram 44 had been received. The provision of a number of items of check data 68 now means that each individual datagram 60 can be accessed immediately after its receipt.

Figure 6:
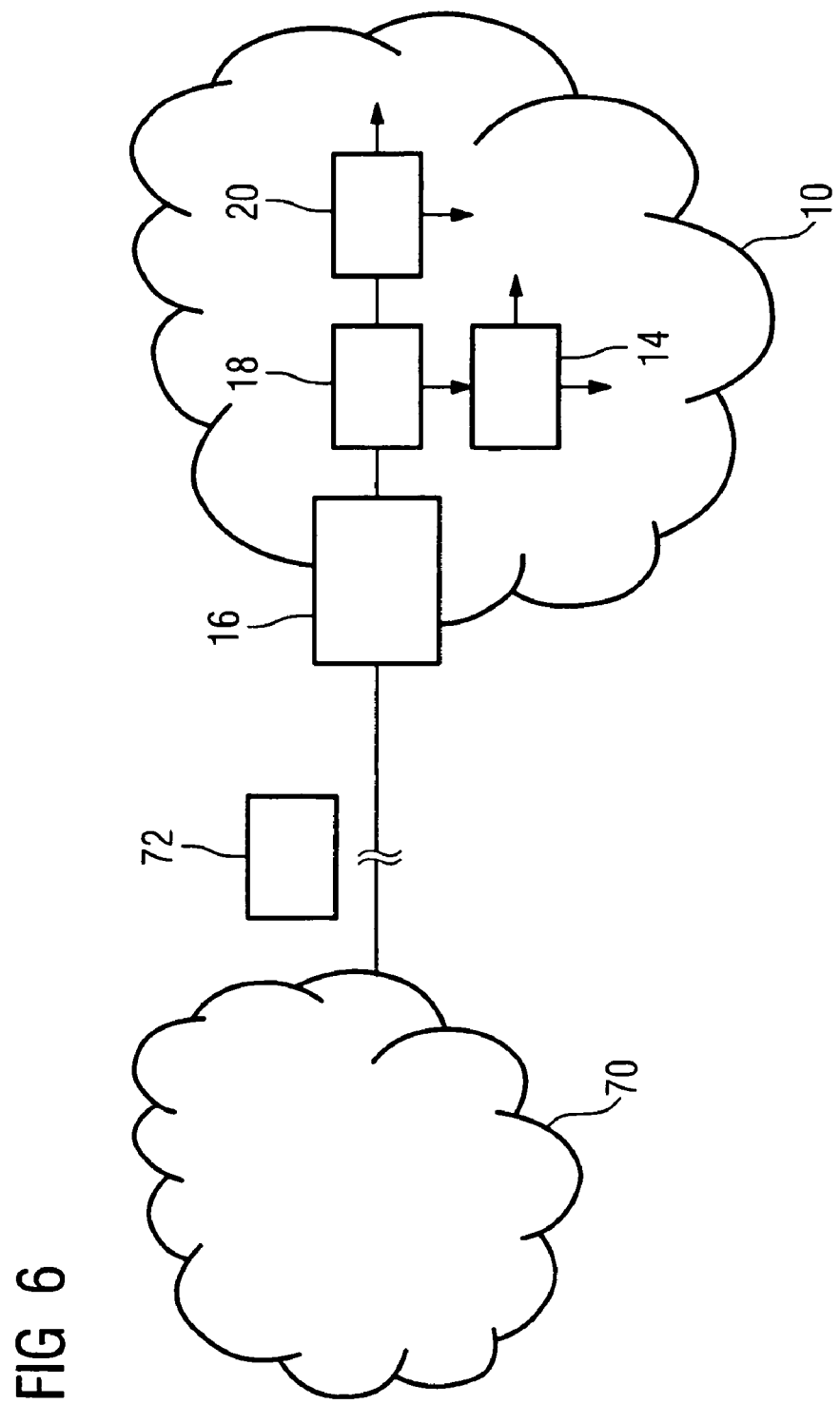

According to a further, optionally independently patentable, aspect of the invention provision is made for the network components 16-26 also to handle communication with communications subscribers of a domain 70 that does not belong to the automation system 10 in an optimized manner. This aspect of the invention is described in more detail with reference to FIGS. 6 and 7. FIG. 6 shows a remote domain 70 as well as the automation system 10, which is considered to be the local domain. A communications connection exists to this remote domain 70, which is not part of the automation system 10, with one of the network components 16-26, in this instance the communications subscriber shown as the first network component 16 in FIG. 1, functioning as an interface for this communications connection.

Data packets referred to as external telegrams 72 to distinguish them from the telegrams 44 forwarded within the automation system 10 can be exchanged with the remote domain 70. These external telegrams 72 can have the scope permitted according to the protocol selected for the communications connection existing between the automation system 10 and the remote domain 70. A length permitted here may be too long to be forwarded from the communications subscribers 14 within the automation system 10 without exceeding a cycle time defined for data traffic within the automation system 10 in the process. Provision is therefore made for every network component 16 functioning as an interface with a domain 70 not included in the automation system 10 to process communication from there in such a manner that incoming external telegrams 72 are divided during receipt into telegrams of a predetermined or predeterminable maximum length for forwarding within the automation system 10, with the telegrams thus resulting being forwarded or being provided for forwarding immediately after production by separation from the original telegram.

The respective network component 16 recognizes its "interface characteristic", in other words its association with the automation system 10 on the one hand and the connection to a domain 70 not belonging to the automation system 10 on the other hand, for example based on a so-called discovery protocol. An associated flag (not shown) is then set for example in the manner known per se and evaluated during further operation of the network component 16.

The telegrams 44 resulting from the division are then forwarded according to the principle described above. One additional particular feature is that every network component 16-26 in principle periodically handles communication with communications subscribers 14 in the automation system 10, with a data transmission period 74 (see FIG. 7) being subdivided into one segment for cyclical communication (cyclical region 76) and one segment for acyclical communication (acyclical region 78). The number of individual telegrams 44 resulting from the division of the external telegram 72 is forwarded here by the respective network component 16 in the course of the acyclical region 78. This is shown in a schematically simplified manner in FIG. 7. FIG. 7 also shows that the telegrams 44 resulting from division of an external telegram 72 are forwarded successively in the acyclical regions 78 of data transmission periods 74 following one another, in particular following one another directly, in other words one of the telegrams 44 resulting from the external telegram 72 is forwarded respectively in an acyclical region 78 of a data transmission period 74 in each instance. Therefore a number of data transmission periods 74 corresponding to the number of resulting telegrams 44 is required to forward the complete content of an external telegram 72.

For the forwarding of the telegrams 44 resulting from a division of an external telegram 72 to take place within the automation system 10 without additional outlay, provision is made for the respectively involved network component 16 to supplement the telegrams 44 resulting from division of an external telegram 72 respectively with address data 80 as included in the original external telegram 72. This address data 80 allows the resulting individual telegrams 44 to be forwarded, in some instance with recourse to an FDB (described above), by way of a possible number of communications subscribers 14 within the automation system 10 along a communications path to the respective destination communications subscriber, which can optionally also be located outside the automation system 10.

As with the division of an external telegram 72 on its transfer into the automation system 10 into a number of individual telegrams 44, which respectively comply, particularly in respect of their length, with the conventions within the automation system 10, provision is also made to (re)combine such telegrams 44. A network component 16 then functioning almost in the manner of an output interface with the domain 70 that does not belong to the automation system 10 combines telegrams 44 received one after the other, from which the origin due to division of an external telegram 72 and therefore the association of which can be recognized. The address data 80 is retained at least once in this process, so that it remains possible to forward the resulting telegram to the originally intended destination communications subscriber. Such a combining of a number of telegrams 44 to form a "composite telegram" always results, when the underlying telegrams 44 are intended for a domain 70 that does not belong to the automation system 10.

To summarize, individual aspects of the invention can be described as follows: the invention primarily relates to a network component 16-26 with at least three ports 28-32 and a method for the operation thereof, with the ports 28-32 being assigned exclusively to individual hierarchical levels of a topology of an automation system 10, in which the network component 16-26 can be or is operated together with any number of further network components 16-26, so that telegrams 44 sent in the automation system 10 can be forwarded efficiently, particularly on the basis of designators assigned to the or each network component 16-26 as an alias 42, said designators being allocated according to a separate aspect of the invention using an in particular recursive method.

The invention claimed is:

1. A method for operating network components in an automation system, comprising:
    providing and using network components, each network component including a first, second and third input and output port;
    assigning an alias to each network component, the alias providing information about a hierarchical position of the network component in the automation system;
    transmitting telegrams between the network components, wherein the telegrams designate a destination network component at least also based on the alias of the destination network component;
    comparing, upon receipt of a telegram, the alias of the network component receiving the telegram with an alias of a destination network component ('destination alias') contained in the received telegram; and
    forwarding the telegram via the first, second or third port based upon the result of the comparing,
    wherein a telegram is forwarded via the first port, when a component of the alias designating a specific level of the network component ('relevant specific alias segment') and a corresponding component of the destination alias ('relevant destination alias segment') in this sequence satisfy a "less than or equal to" relationship,
    wherein a telegram is forwarded via the second port, when the relevant specific alias segment and the relevant destination alias segment in this sequence satisfy a "greater than or equal to" relationship, and
    wherein a telegram is forwarded via the third port, when the relevant specific alias segment and the relevant destination alias segment satisfy an "equal to" relationship.

2. The method as claimed in claim 1, wherein each network component is connected via the first and second input and output ports to other network components of a hierarchically identical line, and wherein the network component is connected via the third input and output port to other network components of a hierarchically lower-order line.

3. The method as claimed in claim 1,
    wherein a telegram received via the first port is rejected as misdirected, when the relevant specific alias segment and the relevant destination alias segment in this sequence satisfy a "less than or equal to" relationship, and
    wherein a telegram received via the second port is rejected as misdirected, when the relevant specific alias segment and the relevant destination alias segment in this sequence satisfy a "greater than or equal to" relationship.

4. The method as claimed in claim 1,
    wherein each network component recognizes an association with the automation system and a connection to a domain not belonging to the automation system, based on a discovery protocol and sets an associated flag,
    wherein the network component communicates with other network components periodically, each data transmission period being subdivided into one segment for cyclical communication ('cyclical region') and one segment for acyclical communication ('acyclical region'), and
    wherein each network component processes incoming communication from each domain not belonging to the automation system such that incoming external telegrams are divided into telegrams with a predetermined maximum length and a series of telegrams thus resulting is forwarded in the course of the acyclical region.

5. The method as claimed in claim 2,
    wherein each network component recognizes an association with the automation system and a connection to a domain not belonging to the automation system, based on a discovery protocol and sets an associated flag,
    wherein the network component communicates with other network components periodically, each data transmission period being subdivided into one segment for cyclical communication ('cyclical region') and one segment for acyclical communication ('acyclical region'), and
    wherein each network component processes incoming communication from each domain not belonging to the automation system such that incoming external telegrams are divided into telegrams with a predetermined maximum length and a series of telegrams thus resulting is forwarded in the course of the acyclical region.

6. The method as claimed in claim 4, wherein the telegrams resulting from division of an external telegram are forwarded successively in the acyclical regions of data transmission periods following one another directly.

7. The method as claimed in claim 4, wherein each network component supplements telegrams resulting from division of an external telegram with address data as included in an original external telegram.

8. The method as claimed in claim 5, wherein each network component supplements telegrams resulting from division of an external telegram with address data as included in an original external telegram.

9. The method as claimed in claim 6, wherein each network component supplements telegrams resulting from division of an external telegram with address data as included in an original external telegram.

10. The method as claimed in one of claim 6, wherein in an event of successive receipt of a plurality of telegrams originating from a division of an external telegram in the acyclical region of data transmission periods following one another directly, each network component combines these into one telegram retaining address data at least once, when underlying telegrams are intended for a domain that does not belong to the automation system.

11. The method as claimed in one of claim 7, wherein in an event of successive receipt of a plurality of telegrams originating from a division of an external telegram in the acyclical region of data transmission periods following one another directly, each network component combines these into one telegram retaining address data at least once, when underlying telegrams are intended for a domain that does not belong to the automation system.

12. The method as claimed in one of claim 8, wherein in an event of successive receipt of a plurality of telegrams originating from a division of an external telegram in the acyclical region of data transmission periods following one another directly, each network component combines these into one telegram retaining address data at least once, when underlying telegrams are intended for a domain that does not belong to the automation system.

13. The method as claimed in claim 1, wherein each network component organizes telegrams, which the network component has received for forwarding to a destination network component, taking into consideration at least the components of the alias of the destination network component included in each such telegram designating a specific level of the network component, forms a compacted telegram there from by lining up payload (data frames) included in the received telegrams, and forwards the compacted telegram instead of the received telegrams.

14. The method as claimed in claim 13, wherein in conjunction with receipt of a compacted telegram, each network component extracts datagrams intended for the network component, and wherein the compacted telegram is shorted by each extracted datagram.

15. The method as claimed in claim 13, wherein check data is assigned to each datagram in a compacted telegram.

16. An automation system, comprising:
a plurality of communications subscribers connected for communications purposes; and
at least one network component including
a first input and output port,
a second input and output port; and
a third input and output port,
wherein the network component is connected via the first and second input and output ports to the communications subscribers or other network components of the automation system within a hierarchically identical line, and
wherein the network component is connected via the third input and output port to the communication subscribers or the other network components of the automation system of a hierarchically lower-order line,
wherein a unique alias is allocated to each communications subscriber and network component based upon the following system:

a) starting from a central communications subscriber for all communications subscribers, which are connected to the central communications subscriber in a hierarchically identical line, a component of the respective alias of this communications subscriber, in particular of a network component, designating a first level of communications connections in the automation system, is increased with distance from the central communications subscriber;

b) for all network components reached in this manner, to which at least one communications subscriber is connected directly or indirectly by way of the third port, an alias is allocated to the communications subscriber, which is formed from the alias of a hierarchically higher-order network component by adding a component designating a hierarchically lower-order level of communications connections in the automation system;

c) steps a) and b) are repeated for all network components, to which an alias was allocated according to step b), with the respective network component taking the place of the central communications subscriber and the respective hierarchical level taking the place of the first level of communications connections.

17. The automation system as claimed in claim 16, further comprising:
a computer readable medium storing a computer program with program code instructions that, when executed on a computer, perform a method for operating network components in an automation system, each network component including a first, second and third input and output port, comprising:
assigning an alias to the network component, the alias providing information about a hierarchical position of the network component in the automation system;
transmitting telegrams between the network components, wherein the telegrams designate a destination network component at least also based on the alias of the destination network component;
comparing, upon receipt of a telegram, the alias of the network component receiving the telegram with an alias of a destination network component ('destination alias') contained in the received telegram; and
forwarding the telegram via the first, second or third port based upon the result of the comparing.

\* \* \* \* \*